Figure 1:
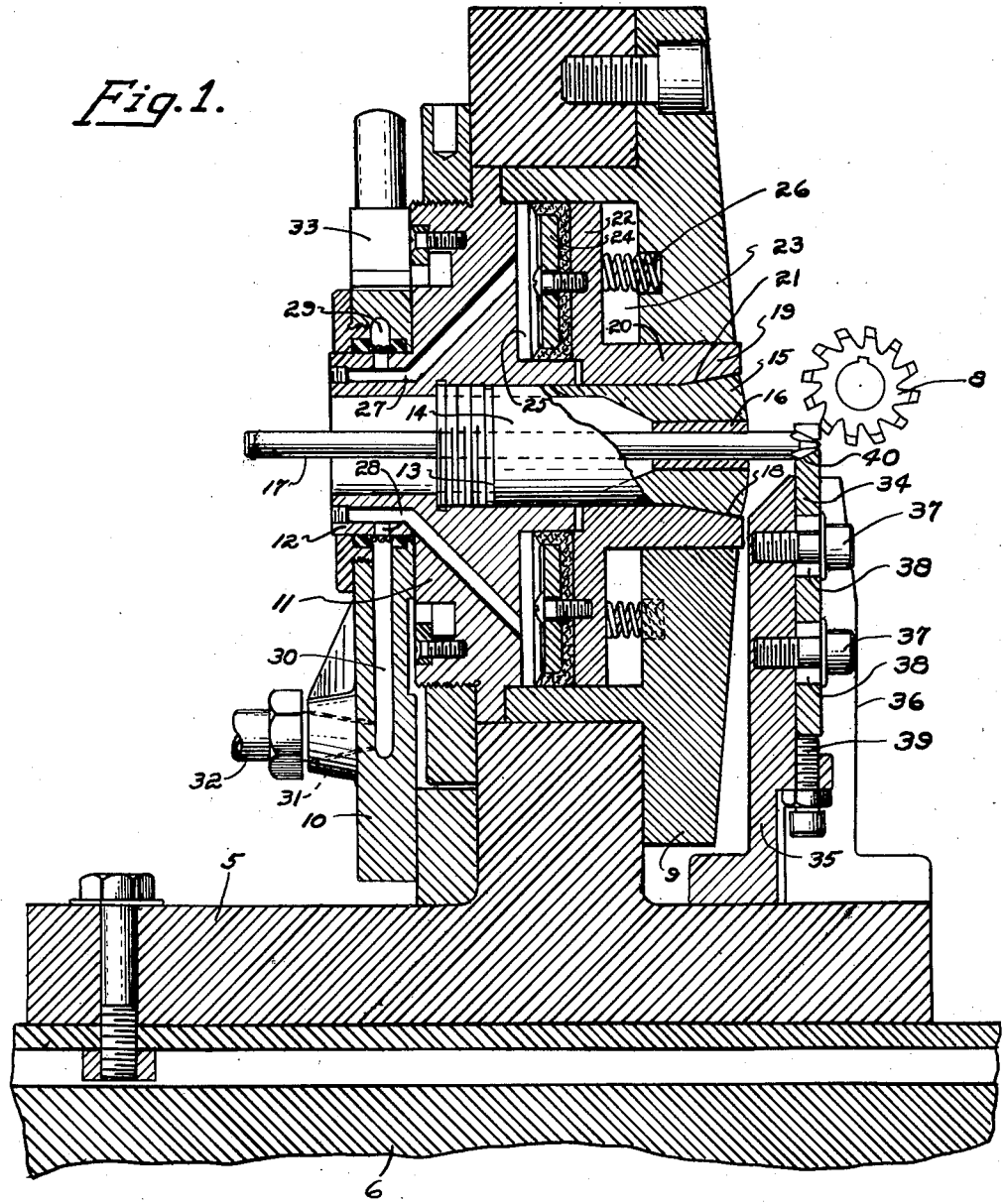

June 2, 1953 W. N. FRANK 2,640,399
WORK SUPPORT

Filed Feb. 5, 1948 2 Sheets-Sheet 1

INVENTOR.
WALTER N. FRANK
BY
ATTORNEY

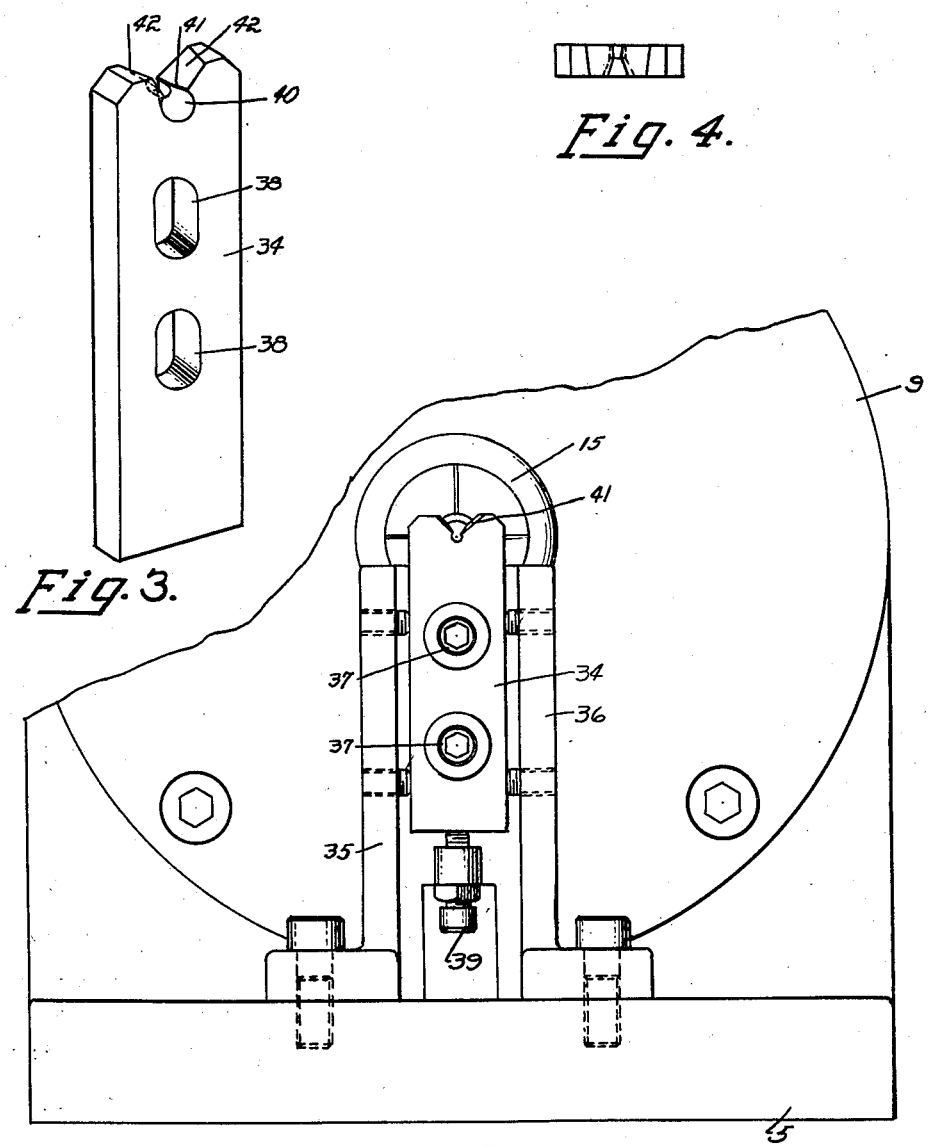

Patented June 2, 1953

2,640,399

UNITED STATES PATENT OFFICE 2,640,399

WORK SUPPORT

Walter N. Frank, Dayton, Ohio, assignor to The Apex Machine & Tool Company, Dayton, Ohio, a corporation of Ohio Application February 5, 1948, Serial No. 6,476

7 Claims. (Cl. 90—18)

This invention relates to a device for supporting the end portion of a work piece during a cutting operation thereon, and is designed more particularly for supporting the tapered end of a Phillips type screw driver bit while said end is being slotted, but is not limited to such use.

The Phillips type screw has two intersecting slots in the head thereof and the bit for driving such a screw has a tapered end portion which is slotted to provide the same with four radial ribs adapted to enter the end portions of the respective slots in the screw head. In manufacturing such a bit it is usually mounted in a chuck with the tapered end thereof projecting beyond the end of the chuck. While so mounted the tapered end of the bit is acted upon by a rotary cutter to successively form the four slots therein. The action of the cutter subjects the projecting end portion of the bit to heavy transverse pressure which tends to, and often does, deflect the projecting end portion of the bit from its true axial position. As a result of such deflection the slots are improperly formed and the bit will not properly engage the slots in the screw head.

The main object of the invention is to provide means for preventing the deflection of the projecting portion of such a bit during the slotting operation and thus insuring the forming of proper slots.

A further object of the invention is to provide in a machine for operating on the end portion of a work piece a simple efficient device for supporting the end of the work piece against deflection, which will not interfere with or retard the normal operation of the machine.

A further object of the invention is to provide such a support which can be easily installed on an existing machine without material change in the construction or operation of the machine.

Other objects of the invention may appear as the invention is described in detail.

In the accompanying drawings Fig. 1 is a vertical section taken through a milling machine equipped with my supporting device; Fig. 2 is an end view of a portion of such a machine showing the supporting device in front elevation; Fig. 3 is a detail view of the supporting element; and Fig. 4 is a top plan view of the supporting element.

In these drawings I have illustrated one embodiment of the invention and have shown the same in connection with a milling machine of a known type, but it is to be understood that the supporting device may take various forms and may be used with any machine suitable for slotting or otherwise operating on the end portions of bits or other work pieces of various kinds.

The illustrated machine, being of a known type, will be described only in sufficient detail to enable the bit slotting operation to be understood. This machine comprises a base 5 which is mounted on a suitable support 6 for movement toward and from a rotary cutter 8, the cutter being mounted, by means not here shown, in a predetermined position with relation to the support 6. The frame of the machine comprises upright front and rear frame members, 9 and 10, mounted on the base 5. A chuck supporting member 11 is arranged between the frame members and provided with a rearwardly extending small diameter portion, or trunnion, 12 which is rotatably mounted in the rear frame member 10. The chuck supporting member 11 is provided with an axial recess 13 in which is rigidly secured the rear end of a tubular chuck 14 the forward end portion of which is slotted to provide the same with jaws 15; the forward portions of the jaws being thickened and provided with recessed parts 16 to receive and grip a bit or work piece 17. Each jaw is provided at its forward end with an inclined outer surface 18 constituting a cam surface. Arranged between the rotatable chuck supporting member 11 and the front frame member 9 is a chuck actuating device 19 which is slidably supported and includes a forwardly extending cylindrical part 20 mounted in the front frame member, extending about the jaws 15 and having an inner cam surface 21 to cooperate with the cam surfaces of the jaws. The member 19 further includes a radially extending portion or flange 22 arranged in a cavity 23 formed in the front frame member, the rear end of the cavity being closed by the front surface of the chuck supporting member 11. An annular piston 24 is mounted on the rear face of the flange 22 and is spaced from the chuck supporting member to provide between that member and the piston an air chamber 25. A spring 26 confined between the part 22 and the front frame member urges the part 22 and the piston 24 rearwardly. The air chamber 25 is connected by a duct 27 with radial ports 28 in the small diameter portion of the chuck supporting member 11 and these ports communicate with an annular air channel 29 formed in the frame member 10 about the portion 12 of the chuck supporting member. The channel 29 is connected by a duct 30 with an air inlet port 31 which in turn is connected by a conduit 32 with a suitable source of supply of air under pressure and is provided with a valve or other means, not shown, for controlling the flow of air to the air chamber 25. An actuating, or indexing, device, a part of which is shown at 33, is provided for imparting rotation to the chuck supporting member and the chuck.

When the machine is idle the air supply is cut off and the piston 24 is retained in its retracted position by the spring 26, thereby retaining the chuck actuating device 20 in its retracted position. With the parts in these positions the bit, which has been provided with a tapered end, is inserted in the chuck. The air valve is then closed to actuate the piston and cause the bit to be firmly gripped by the chuck. In this position the tapered end portion of the bit extends substantially beyond the forward end of the chuck but is spaced from the rotating cutter 8. The machine is then moved forwardly on the support 6 to move the tapered end of the bit into engagement with the cutter which forms the first slot in the tapered end of the bit. When this slot has been formed the machine as a whole is retracted, the chuck supporting member and chuck rotated through a quarter rotation and the machine again advanced to cause a second slot to be cut in the tapered end of the bit. These operations are repeated until the four slots have been cut and the machine is then retracted, the air supply cut off to release the bit and the latter is removed and another bit inserted in the chuck.

The pressure exerted on the projecting end of the bit by the cutter, during the cutting operation, tends to deflect the bit downwardly, and if so deflected the slot formed therein will be of insufficient depth or will be otherwise defective. To prevent this deflection of the end portion of the bit and thus insure the proper forming of the slots in the bit I have provided a supporting device arranged to engage the projecting end portion of the bit and to positively support the same against deflection. This supporting device may take various forms but it is preferably provided with a cavity into which the tapered end of the bit extends and has supporting engagement with the wall of the recess. In the construction here shown the supporting device comprises a flat relatively narrow plate 34 which is mounted on the base 5 of the machine. In the present instance the plate is arranged between upright members 35 and 36 rigidly secured to said base and clamped against the plate 34 by screws 37 extending through openings 38 in the plate. The openings are preferably elongated to permit the vertical adjustment of the supporting plate and an adjusting screw 39 engages the lower end of the plate to retain the same in its adjusted position. In its upper end portion the plate is provided with a cavity 40 a part of which is arranged in axial alinement with the chuck and is preferably shaped to conform to the shape of the projecting end of the bit so as to fit snugly about the same. When, as in the present instance, the forward end of the bit is tapered this cavity preferably comprises a tapered or frusto-conical opening extending through the supporting plate adjacent the upper edge of the latter and that portion of the plate above the opening 40 is slotted as shown at 41 to permit the cutter to engage the end of the bit which is in the opening 40. The slot 41 is preferably of a width less than the width of the opening 40 so that the wall of the opening extends about the major portion of the end of the bit and thus firmly supports the same. The side walls 42 of the slot converge downwardly to the opening so as to provide the cavity with a flared upper portion. Due to the tapered shape of the recess the lower edges of the side walls converge forwardly but are at all points of a width sufficient to permit the passage of the cutter. The supporting plate being mounted on the base of the machine with the opening 40 in axial alinement with the chuck the tapered end of the bit will enter the opening when the bit is inserted in the chuck and the supporting device will accurately position the same with relation to the cutter.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a machine comprising a cutter rotatable about a fixed axis, a base movable toward and from said cutter, a chuck mounted on said base in a fixed position with relation thereto and adapted to support a work piece with one end thereof projecting beyond said chuck toward said cutter, and a supporting element mounted on said base in a fixed position with relation to said chuck and having a cavity to receive said end of said work piece and support the same against deflection, whereby the end of the work piece may be inserted in said cavity simultaneously with its insertion in said chuck, will be held against movement with relation to said work piece and will be moved into engagement with said cutter by the movement of said base toward said cutter.

2. In a machine comprising a cutter rotatable about a fixed axis, a base movable toward and from said cutter, a chuck mounted on said base in a fixed position with relation thereto and adapted to support a work piece with one end thereof projecting beyond said chuck toward said cutter, and a supporting element mounted on said base in a fixed position with relation to said chuck and having a cavity to receive said end of said work piece and support the same against deflection, the wall of said cavity extending about and engaging said end of said work piece for the major portion of its circumference to accurately center the same with relation to said chuck and prevent the deflection thereof by said cutter.

3. In a machine comprising a cutter rotatable about a fixed axis, a base movable toward and from said cutter, a chuck mounted on said base in a fixed position with relation thereto and adapted to support a work piece with one end thereof projecting beyond said chuck toward said cutter, and a supporting element mounted on said base in a fixed position with relation to said chuck and having a cavity to receive said end of said work piece, the wall of said cavity engaging said end of said work piece to center the same with relation to said chuck and prevent deflection thereof by said cutter, and having an opening through which said cutter may operate on that portion of said work piece which is within said cavity.

4. In a machine comprising a cutter rotatable about a fixed axis, a base movable toward and from said cutter, a chuck mounted on said base in a fixed position with relation thereto and adapted to support an elongate work piece having a tapered end with said tapered end projecting beyond said chuck toward said cutter.

and a supporting element rigidly mounted on said base and having a tapered cavity in axial alinement with said chuck to receive the tapered end of said work piece, the wall of said cavity having a cutter receiving opening extending lengthwise thereof and being of a width less than the width of said cavity.

5. In a machine comprising a cutter rotatable about a fixed axis, a base movable toward and from said cutter, a chuck mounted on said base in a fixed position with relation thereto and adapted to support a work piece with one end thereof projecting beyond said chuck toward said cutter, an upright plate rigidly mounted on said base below said chuck with its upper end portion in line with and spaced from said chuck, said plate having adjacent its upper end an opening to receive said end portion of said work piece, that portion of said plate above said opening having a relatively narrow slot extending lengthwise of said opening to permit said cutter to enter said opening, the wall of said opening having engagement with said work piece on both sides of and below said slot.

6. A device for supporting the end portion of an elongate work piece against deflection by a cutter operating on one side of said end portion thereof, comprising a plate of rigid material extending transversely to said work piece and having in one end portion thereof a cavity extending through the same, said cavity having an inner portion shaped to receive the end portion of said work piece, to limit the forward movement of said work piece with relation to said plate and to support the same in a fixed position, and also having a cutter passageway extending through the edge of said plate and of a width less than the width of said inner portion of said cavity, and means for mounting said plate on a supporting structure.

7. A device for supporting the end portion of an elongate work piece against deflection by a cutter operating on one side of said end portion thereof, comprising a rigid element having an opening therethrough adjacent one edge thereof, said opening being tapered in the direction of the length of said work piece to receive a tapered end portion of said work piece, the wall of said opening engaging said work piece to accurately position and rigidly support the same, said element having in said edge thereof a slot through which said cutter may enter said opening.

WALTER N. FRANK.

References Cited in the file of this patent
UNITED STATES PATENTS

| Number | Name | Date |
|---|---|---|
| 1,808,665 | Konig | June 2, 1931 |
| 2,068,915 | Hardin | Jan. 26, 1937 |
| 2,169,467 | Leisner | Aug. 15, 1939 |
| 2,190,855 | Wickens | Feb. 20, 1940 |